(12) United States Patent
Wolf et al.

(10) Patent No.: US 12,487,069 B2
(45) Date of Patent: Dec. 2, 2025

(54) CHAIN SENSOR DEVICE AND METHOD FOR DETERMINING WEAR

(71) Applicant: iwis antriebssysteme Gmbh & Co. KG, Munich (DE)

(72) Inventors: Thomas Wolf, Erdweg (DE); Josef Siraky, Donaueschingen (DE)

(*) Notice: Subject to any disclaimer, the term of this patent is extended or adjusted under 35 U.S.C. 154(b) by 0 days.

(21) Appl. No.: 17/705,695

(22) Filed: Mar. 28, 2022

(65) Prior Publication Data

US 2022/0307813 A1    Sep. 29, 2022

(30) Foreign Application Priority Data

Mar. 29, 2021  (DE) .................. 10 2021 107 895.4

(51) Int. Cl.
*G01M 13/023* (2019.01)
*G01B 7/04* (2006.01)
*G01B 11/04* (2006.01)

(52) U.S. Cl.
CPC ............ *G01B 7/042* (2013.01); *G01B 11/043* (2013.01); *G01M 13/023* (2013.01)

(58) Field of Classification Search
CPC .................................................. G01M 13/023
See application file for complete search history.

(56) References Cited

U.S. PATENT DOCUMENTS

| | | | |
|---|---|---|---|
| 5,291,131 A | 3/1994 | Suzuki et al. | |
| 5,482,154 A * | 1/1996 | Affeldt | B65G 47/965 |
| | | | 198/810.04 |
| 5,563,392 A * | 10/1996 | Brown | G01B 11/043 |
| | | | 324/206 |
| 7,540,374 B2 | 6/2009 | Rathbun et al. | |
| 2004/0226805 A1* | 11/2004 | Lodge | B65G 43/02 |
| | | | 198/810.02 |
| 2014/0102212 A1* | 4/2014 | Urbanzyk | G01B 21/06 |
| | | | 73/828 |
| 2015/0061650 A1* | 3/2015 | Strietzel | G01D 5/204 |
| | | | 324/207.15 |
| 2017/0225901 A1* | 8/2017 | Brown | B65G 43/02 |
| 2019/0062067 A1* | 2/2019 | Kreisfeld | G01B 11/043 |
| 2019/0062068 A1* | 2/2019 | Kreisfeld | G01B 11/043 |
| 2019/0086239 A1* | 3/2019 | Kreisfeld | G01D 5/20 |
| 2020/0055710 A1* | 2/2020 | Hashioka | F16H 7/00 |
| 2022/0307814 A1* | 9/2022 | Wolf | G01B 7/046 |
| 2022/0307817 A1* | 9/2022 | Wolf | F16G 13/06 |

FOREIGN PATENT DOCUMENTS

| | | |
|---|---|---|
| DE | 102017121706 | 3/2019 |
| EP | 1464919 | 10/2004 |

* cited by examiner

*Primary Examiner* — Eric S. McCall
(74) *Attorney, Agent, or Firm* — JMB DAVIS BEN-DAVID

(57) ABSTRACT

The invention relates to a method of determining the elongation of segments of a chain during operation, comprising the following steps: Performing a first detection to determine a position of a first chain component and detecting a first measurement value, performing a second detection to determine a position of a second chain component and detecting a second measurement value, and determining the distance L between the first and the second chain component, wherein the first detection and the second detection are performed simultaneously.

16 Claims, 6 Drawing Sheets

CHAIN SENSOR DEVICE AND METHOD FOR DETERMINING WEAR

CROSS-REFERENCE TO RELATED APPLICATIONS

Benefit is claimed to German patent application No. 10 2021 107 895.4, filed on Mar. 29, 2021, the contents of which are incorporated by reference herein in their entirety.

FIELD

The invention relates to a method of determining the elongation of segments of a chain during operation, the method comprising the following steps: Performing a first detection to determine a position of a first chain component and detecting a first measurement value, performing a second detection to determine a position of a second chain component and detecting a second measurement value, and determining the distance L between the first and the second chain component.

BACKGROUND

Chain drives are used in a wide range of industrial applications for driving or transportation purposes. Often, a plurality of chain strands are used. Besides a chain that usually circulates endlessly, a complete chain drive also includes a plurality of sprockets that serve to deflect the chain, as well as driving elements or transporting elements that are connected to the chain and are actuated by the chain. Due to abrasion of the mutually movable parts in the chain joint, a chain is subject to wear during operation. Other factors, such as elongation when the chain is run in, stretching, bearing clearance, and bearing wear, can also lead to elongation of the chain and ultimately to failure of the drive unit. Other factors influencing the wear of a chain are the forces acting on the chain and loads, or external influences determined by the environment. Due to the complexity of these interrelationships, it is not possible to predict the wear of the chain, rendering it impossible to predict a possible disturbance in the operational process or even the failure of the drive unit.

Complex chain drives are increasingly used due to the steady increase in fully automated machines and systems, as they are necessary for modern factory automation. As a result of the high investment costs for such a high degree of automation and the global price pressure, it is necessary to reduce the downtimes of the machines and plants to an absolute minimum and to prevent unplanned downtimes altogether.

In addition to direct financial losses, such unplanned downtimes also lead to indirect problems, such as the interruption of the logistics chain through to delivery times that cannot be met, and thus to further financial losses. Even a small amount of wear, however, can mean that processes synchronized by chain drives lead to production failures and have to be readjusted manually. Since the wear of a drive chain or even its elongation cannot be avoided and also cannot be predetermined, continuous monitoring of a chain drive is indispensable in order to be able to carry out timely inspections for adjusting the synchronized sequences and replacing defective chains.

U.S. Pat. No. 5,291,131 describes a suitable method of monitoring the longitudinal expansion of a circulating drive chain. In this method, two markings spaced apart in the longitudinal direction of the chain are provided on the drive chain, the position of which markings is detected during operation by two inductive or optical sensors that are also spaced apart. Using a connected data collection system, the measurement values from the two sensors can be used to determine the circulating speed of the chain and the chain elongation in the chain segment between the spaced markings. Conclusions about the other areas of the chain or within small segments of the chain are not possible with this method.

A similar method of monitoring the wear of a drive chain is described in EP 1 464 919 A1. Here, too, two markings made of a magnetic material are provided on opposite sides of the chain. Two inductive sensors provided next to the chain generate an electrical signal when the magnetic sensors are passed. The sensors are arranged at a distance from one another on opposite sides of the drive chain so that the sensors are initially triggered simultaneously. As soon as the wear elongation of the chain results in a time delay between the triggering of the sensors, the wear elongation of the chain can be determined via a position shift of the sensors. As in the case described above, the measurement values of the two sensors can be used to determine the circulating speed of the chain and the chain elongation in the chain segment between the spaced markings. Conclusions about the other areas of the chain or within small segments of the chain are also not possible with this method.

U.S. Pat. No. 7,540,374 B2 describes another device for measuring wear elongation of a drive chain by means of two optical sensors. Here, the first sensor detects the first chain joint of a chain link and a second sensor determines the position and distance of the second chain joint. In addition, the distance of a plurality of chain links can also be determined at two spaced measuring positions.

It is furthermore known from the prior art how to determine the wear of a drive chain by measuring the force, the path, or the angle of rotation of chain tensioners or two rotational angle sensors on the drive wheel and the load wheel. However, a chain tensioner is not needed everywhere, and rotational angle sensors cannot be used everywhere either. In addition, these are then influenced by wear or chain elongation.

However, such methods must be precisely adjusted to the specific process in each case since the measurement in these cases depends on the total chain length and on the wear of the sprockets. The adjustment is very complex and failure prone. Therefore, these procedures are not generically applicable.

The aforementioned devices and methods known from the prior art have a number of different disadvantages, depending on the sensors and measuring principle used.

Conventional measuring systems require a drive with a constant speed for an accurate measurement of the chain elongation and such systems react with measuring failures to irregularities in the drive system, for example a relative slip between the drive wheel and the drive chain or the wear of the sprockets.

All devices and methods known to date, however, also have in common in particular that the elongation of the chain cannot be traced back to the elongation of individual chain segments. In the case of detected elongation, this means that the chain as a whole always has to be replaced, which is associated with significantly higher costs. Furthermore, this means that the limit values specified up to the replacement of the chain also must take into account singularities in the chain elongation and thus significantly lower limit values are required than if the elongation of individual chain segments or even chain links were known. Although some devices and methods already allow measurement of values that enable elongation also for chain segments, these values cannot be assigned to individual chain segments considered during a measurement, so that this in turn leads to complete replacement of the chain.

The object of the invention is therefore to provide a method of determining the elongation of segments of a chain, by which failure conditions of the monitored chain can be reliably and quickly detected, the elongation of each individual chain segment can be determined, the monitored chain does not have to have a minimum speed, and the elongation of the chain can also be statistically obtained over a longer period of time.

It is also the object of the invention to provide a sensor device with which failure conditions of the monitored chain are reliably and quickly detected, the elongation of each individual chain segment is determined, the monitored chain does not have to have a minimum speed, and the elongation of the chain can also be statistically obtained over a longer period of time.

This object is achieved by a method of determining the elongation of segments of a chain according to claim 1. Additional advantageous embodiments of the invention are set out in the dependent claims.

SUMMARY

The method according to the invention for determining the elongation of segments of a chain involves three steps: In the first step, a first detection is performed to determine the position of a first chain component and a first measurement value is detected. In the second step, a second detection is performed to determine the position of a second chain component and a second measurement value is detected. The chain component is usually a chain bushing, or a chain pin guided in the chain bushing. In the third step, a distance between the first and the second chain component is determined using the position of the first chain component determined from the first detection and the position of the second chain component determined from the second detection. Due to signs of wear, the determined distance between the chain components increases with the operating time of the chain. According to the invention, the first detection and the second detection are performed simultaneously. Likewise, the determination of the distance between the chain components is performed simultaneously. Furthermore, the first and the second detection as well as the determination of the distance between the chain components are advantageously performed continuously. Failure conditions of the monitored chain can therefore be reliably and quickly detected, and the elongation of the chain can also be statistically obtained over a longer period of time.

In a further embodiment of the invention, a length value of the chain is determined from the detected first and second measurement values. The length value is determined using the pitch (distance between two adjacent chain links). Like the distance between the chain components, the length value is determined continuously and is performed simultaneously.

In a development of the invention, the first detection is performed with a first sensor and the second detection is performed with a second sensor. The sensors are particularly suitable for detecting the measurement values for determining the position of the chain components independently of the speed and/or the position of the chain to be monitored. In an optional embodiment, the sensors are suitable for detecting the measurement values for determining the position of the chain components when the chain speed is 0. In a further embodiment of the invention, the measurement values for determining the position of a chain component are detectable at any time.

In a development of the invention, the measurement values from the first and the second sensor are detected simultaneously over a length range of the chain. The length range of the chain here extends in the direction of movement of the chain. The first and the second sensor are provided and suitable for simultaneously detecting measurement values over a length range of the chain.

In a further embodiment of the invention, the length range is greater than or equal to half the length of a chain link, preferably greater than or equal to ¾ the length of a chain link, and particularly preferably greater than the length of a chain link. The length of a chain link results from the defined standard according to a standard chain under British Standard (DIN 8188) or ANSI Standard (DIN 8187).

In a further embodiment according to the invention, the measurement values are detected by means of at least two sensor elements constituting the sensor. These can be, for example, a plurality of photodiodes of a CCD chip or a differential transformer or other sensors arranged in the chain movement direction. The distance between the at least two sensor elements is here limited to the length of less than 2 times a chain link of the chain to be monitored. The length of a chain link results from the defined standard according to a standard chain under British Standard (DIN 8188) or ANSI Standard (DIN 8187).

In a further embodiment of the invention, the first and the second sensor are arranged at a known distance from one another. The sensors are located at a defined distance from one another corresponding to the pitch or an integer multiple of the pitch of the chain. The distance between the two sensors is a parameter for calculating the length value of the chain. Like the distance between the chain components, the length value is determined continuously and is performed simultaneously.

In a further embodiment of the invention, the first and/or the second sensor is/are suitable for detecting the measurement values for determining the position of a chain component over a path length range of the chain. The sensors are designed in such a way that the position of the chain component is determined over a length range. The chain components thus travel a distance in the detection range of the sensors, within which the position of the chain components is determined. In an optional development of the invention, the first and/or the second sensor is/are suitable for simultaneously detecting the measurement values for determining the position of a chain component over the path length range of the chain.

In a further embodiment of the invention, the first and/or the second sensor is/are suitable for detecting the measurement values for determining the position of a chain component of the chain at a chain velocity v, where v=0 m/s. A minimum speed of the chain to be monitored is therefore not necessary, and its monitoring for wear is also possible when the chain is at a standstill.

In a further embodiment of the invention, the positions of the first and/or the second chain component are detected by means of a differential transformer. The sensors each have a primary coil and two symmetrically arranged secondary coils. An AC voltage with constant frequency and amplitude is applied to the primary coils. The AC voltage applied to the primary coils of the two sensors is 180° phase-shifted with respect to one another. An electromagnetic field is generated via the primary coil, which induces an oppositely directed voltage in each of the secondary coils located within it. The secondary coils are geometrically designed in such a way that a chain bushing located above them modulates the voltages in a position-dependent sinusoidal and cosinusoidal manner. Here, U cos and U sin are functions of the chain bushing position above the differential transformer. The amplitudes of the voltages for the same position also change over the distance of the object to the coil. The secondary coils are connected in series in opposite phase, so that the voltages at their terminals subtract from each other. The resulting voltage is exactly zero when the two coils of the two sensors are each symmetrical If the symmetry is disturbed, two output voltages are generated, the phase of which with respect to each other indicates the magnitude of the asymmetry.

In a further embodiment of the invention, the detected chain components are standard chain components. Additional components attached to the chain are not necessary in order to apply the method according to the invention, thus saving additional costs.

In a development of the invention, the detected chain components are the pins and/or the bushings of the chain. The chain components are typically chain bushings or chain pins guided in the chain bushing. Additional components in order to apply the method according to the invention are not necessary.

In a further embodiment of the invention, all of the detected chain components of identical construction, which are passed by the sensors, are detected. The detection of the chain components is performed continuously by determining the positions of all standard chain components of identical construction when and as soon as they are detected by the sensor. It is therefore possible to determine the elongation of individual chain segments in particular. The number of segments depends on the length of the chain to be monitored. Ideally, the number of segments corresponds to the number of chain links of the chain to be monitored, so that each individual chain link is monitored with respect to its elongation.

In a further embodiment of the invention, the position of the first chain component and the position of the second chain component are determined simultaneously.

In a further embodiment of the invention, the length between the first chain component and the similar/identical chain component directly adjacent to the first chain component is determined from the first measurement value and the second measurement value. Due to the continuous determination of the positions of chain components, it is possible to determine the elongation of chain sections and segments. The chain segments can also be designed in such a way that distances between directly adjacent chain components can be determined. This makes it possible to replace individual chain links, particularly in the event of maintenance, and it is not necessary to replace the entire chain.

In a further embodiment of the invention, the position of the first chain component is determined exclusively from the measurement values detected by the first sensor, and/or the position of the second chain component is determined exclusively from the measurement values detected by the second sensor. Each of the two sensors thus simultaneously determines the position of one (in total two) chain components. The distance between the two chain components is determined using the position.

The object is further achieved by the sensor device according to claim 14.

The sensor device according to the invention for determining elongations of segments of a chain has a first and a second sensor. The first sensor is suitable for determining the position of a first chain component exclusively from the measurement values detected by the first sensor. The second sensor is suitable for determining the position of a second chain component exclusively from the measurement values detected by the second sensor. The distance between the two chain components is determined using the position.

In an optional embodiment of the invention, the first and/or the second sensor of the sensor device is/are provided and suitable for detecting the measurement values for determining the position of chain components independently of the speed and/or the position of the chain to be monitored. In an optional embodiment, the first and/or the second sensor is/are adapted to detect the measurement values for determining the position of the chain components when the chain speed is 0. In a further embodiment of the invention, the measurement values for determining the position of a chain component are detectable at any time.

In a development of the invention, the sensor device is suitable for simultaneously detecting the measurement values for determining the position of the first chain component and the position of the second chain component. Likewise, the determination of the distance between the chain components is performed simultaneously. Furthermore, the first and the second detection as well as the determination of the distance between the chain components are advantageously performed continuously. Failure conditions of the monitored chain can therefore be reliably and quickly detected, and the elongation of the chain can also be statistically obtained over a longer period of time.

In an advantageous embodiment of the invention, the first and/or the second sensor is/are suitable for detecting the measurement values for determining the position of the first or the second chain component over a path length range of the chain. The sensors are designed in such a way that the position of the chain component is determined over a length range. The chain components thus travel a distance in the detection range of the sensors, within which the position of the chain components is determined. In an optional development of the invention, the first and/or the second sensor is/are suitable for simultaneously detecting the measurement values for determining the position of a chain component over the path length range of the chain.

In a further embodiment of the invention, the path length range is greater than or equal to ½ segment length. The segments completely cover at least those parts of the chain that are accessible to the chain sensor device for detecting the position. The length or number of segments depends on the length of the chain to be monitored. If a critical value of a physical feature occurs in a single chain link or only very few chain links, this physical feature may remain undetected as a result of averaging the measurement values over a larger range. The size of the path length range takes this into account.

In a further embodiment of the invention, the segment length corresponds to the distance between the first chain component and the directly adjacent chain component.

Ideally, the number of segments corresponds to the number of chain links of the chain to be monitored, so that each individual chain link is monitored with respect to its physical characteristics.

In a development of the invention, the sensor device is suitable and intended for simultaneously detecting the measurement values from the first and/or the second sensor over a length range of the chain. The length range of the chain here extends in the direction of movement of the chain.

In a further embodiment of the invention, the length range is greater than or equal to half the length of a chain link, preferably greater than or equal to ¾ the length of a chain link, and particularly preferably greater than the length of a chain link. The length of a chain link results from the defined standard according to a standard chain under British Standard (DIN 8188) or ANSI Standard (DIN 8187).

In a further embodiment according to the invention, the first and/or the second sensor comprise/s at least two sensor elements constituting the first and/or the second sensor. These can be, for example, a plurality of photodiodes of a CCD chip, or a differential transformer or other sensors arranged in the chain movement direction. The distance between the at least two sensor elements is here limited to the length of less than 2 times a chain link of the chain to be monitored. The length of a chain link results from the defined standard according to a standard chain under British Standard (DIN 8188) or ANSI Standard (DIN 8187).

exemplary embodiments of the method according to the invention for determining the elongation of segments of a chain and of the sensor device according to the invention are shown schematically in simplified form in the drawings and are explained in more detail in the following description.

DETAILED DESCRIPTION

Figure 1:
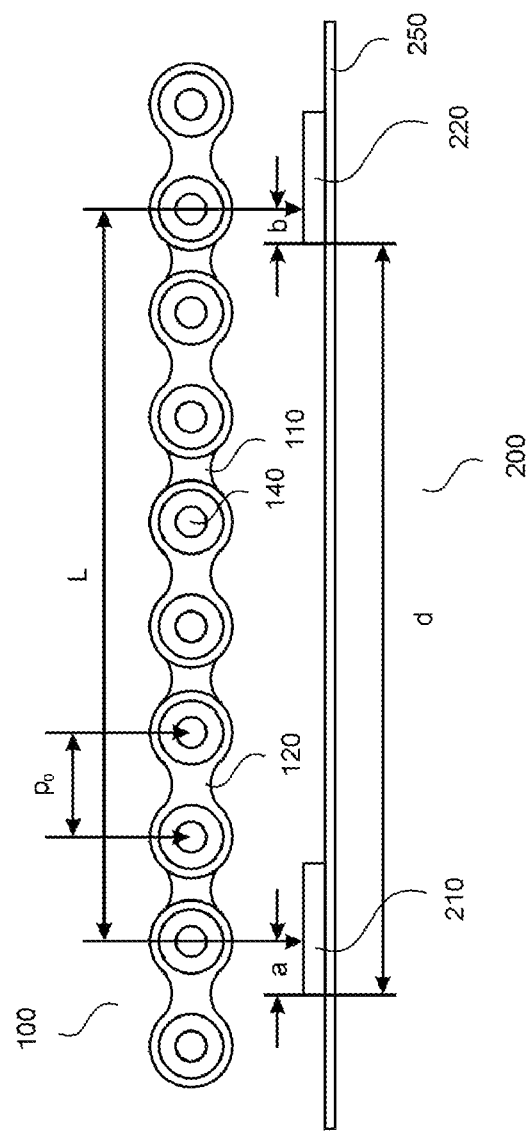
FIG. 1 shows an embodiment of the sensor device according to the invention.
Figure 4:
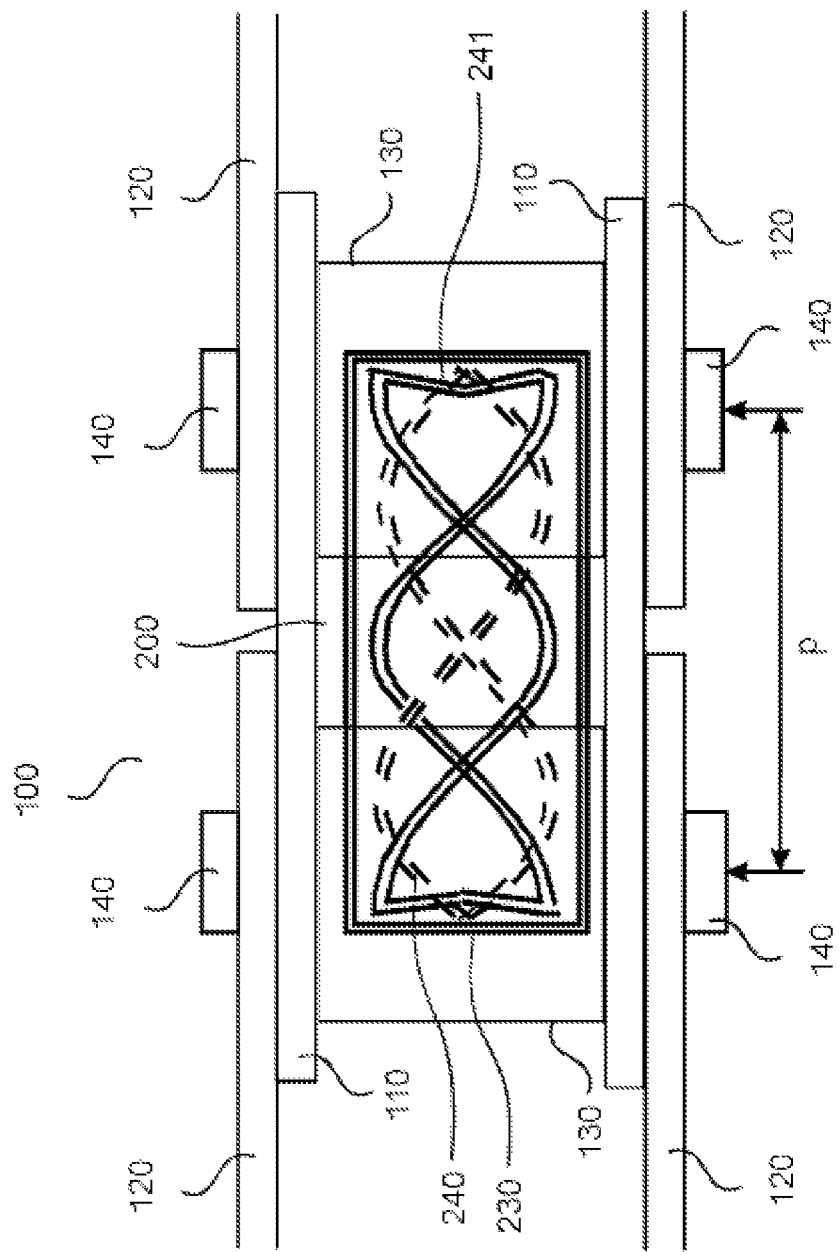
FIG. 4 shows a top view of a sensor and a representation of the operating principle.

FIG. 1 shows the sensor device 200 according to the invention for determining elongations of segments of a chain 100. In this and the following exemplary embodiments, the chain 100 to be monitored is designed as a roller chain and has alternating inner 110 and outer side parts 120, which are connected to one another via chain pins 140 guided in chain bushings 130 (FIG. 4). The distance between the chain pins 140 of the chain 100 in a mint condition is $p_0$.

Figure 2:
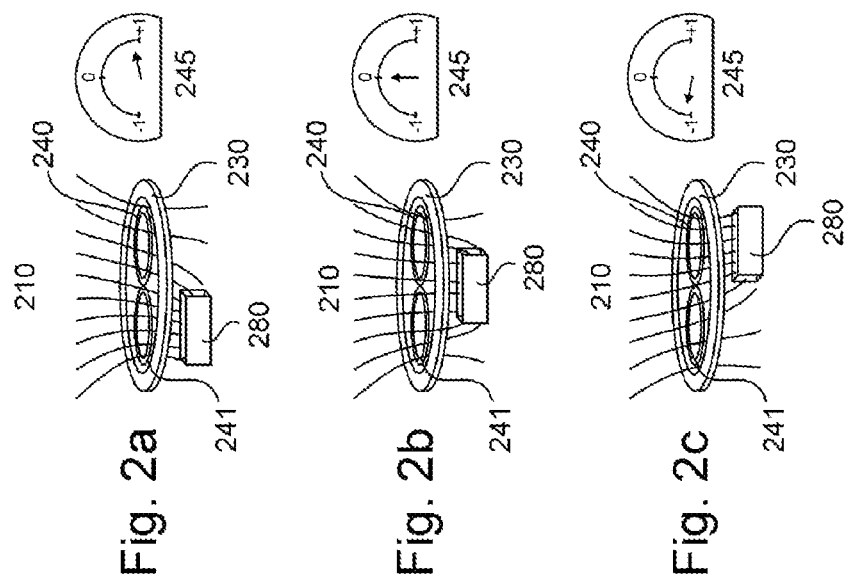
FIG. 2a shows a representation of the operating principle of a sensor when detecting a ferromagnetic body in position 1.
FIG. 2b shows a representation of the operating principle of a sensor when detecting a ferromagnetic body in position 2.
FIG. 2c shows a representation of the operating principle of a sensor when detecting a ferromagnetic body in position 3.

To determine the elongation of the chain 100 during operation, the chain sensor device 200 is positioned perpendicular to the joint axis of the chain 100 to be monitored in such a way that the distance d between the sensors 210, 220 of the chain 100 in a mint condition corresponds to an integer multiple of the distances $p_0$ between two adjacent chain pins 140 of the chain 100 to be monitored. The first sensor 210 and the second sensor 220 of the sensor device 200 itself are arranged on a base plate 250. The sensors 210, 220 together with the electrical connections are arranged in a housing (not shown) for protection against contamination. In this exemplary embodiment, the sensors 210, 220 are designed as a differential transformer as shown in FIG. 2. The sensors 210, 220 are constructed from a primary coil and two secondary coils and thus have three sensor elements. In an optional embodiment, CCD cameras are alternatively used as the first and/or the second sensor. Each of the sensors 210, 220 is thus suitable for simultaneously recording measurement values over a length range of the chain 100 to be monitored. The longitude of the length range in the direction of the chain movement is adjusted according to the length p, $p_0$ of a chain link of the chain 100 to be monitored and is $p_0$ in this embodiment. The measurement values are also detected simultaneously by the two sensors 210, 220.

The length $L_0$ between the sensors 210, 220 of the chain 100 in a mint condition is an integer multiple of the distance $p_0$ of two adjacent chain pins 140 ($L_0 = n \ast p_0$), in this exemplary embodiment seven times the distance $p_0$. A chain pin 140 located above the sensors 210, 220 has a distance a, b to the (in this and the following exemplary embodiments the respective left) edge of the sensors 210, 220. The chain length $L_0$ is therefore $L_0 = d-(a_0+b_0) = d-2a_0 = d-2b_0$ because the distances a, b are equal when the chain 100 is in mint condition ($a_0 = b_0$).

Due to a change in length ΔL of the chain 100, the distances a, b are different. The determination of the elongation ΔL of the chain 100 to be monitored is first done by determining the positions a and b. Then the following applies to the elongation ΔL of the chain 100:

$$\Delta L/L_0 = (L-L_0)/L_0 = L/L_0 - 1$$

and $$\Delta L/L_0 = (d-a+b)/(da_0+b_0)-1 = (bb_0+aa_0)/(d+b_0-a_0).$$

The sensor A 210 generates the positions using the angular functions A sin and A cos, a sensor B 220 generates the positions using the angular functions B sin and B cos. The following then applies for the distances a, b of the chain 100 in the current condition:

$$a = \arctan(A \sin/A \cos), b = \arctan(B \sin/B \cos).$$

The elongation ΔL of the chain 100 then results from the position differences calculated by both sensors A 210, B 220:

$$\Delta L/L_0 = (\arctan(B \sin/B \cos) - \arctan(A \sin/A \cos))/d.$$

To determine the elongation of the chain 100 and its segments, a first detection is performed by means of the first sensor A 210 to determine the position of a first chain component, and a first measurement value is detected. At the same time, by means of the second sensor B 220, a second detection of a second chain component is performed, and a second measurement value is detected. In this exemplary embodiment, the two chain components are the chain bushings located on the chain pin 140. Then, a calculation of the relative distance change of the two chain bushings 130 is performed according to $\Delta L/L_0 = (\arctan (B \sin/B \cos) - \arctan (A \sin/A \cos))/d$. Advantageously, the first and the second detection are performed continuously, and likewise the measurement values are detected continuously. Advantageously, the first and the second detection also take place when the chain 100 is stationary, which is why no minimum speed of the chain 100 is required to operate the chain sensor device 200 due to the absolute position determination.

Figure 3:
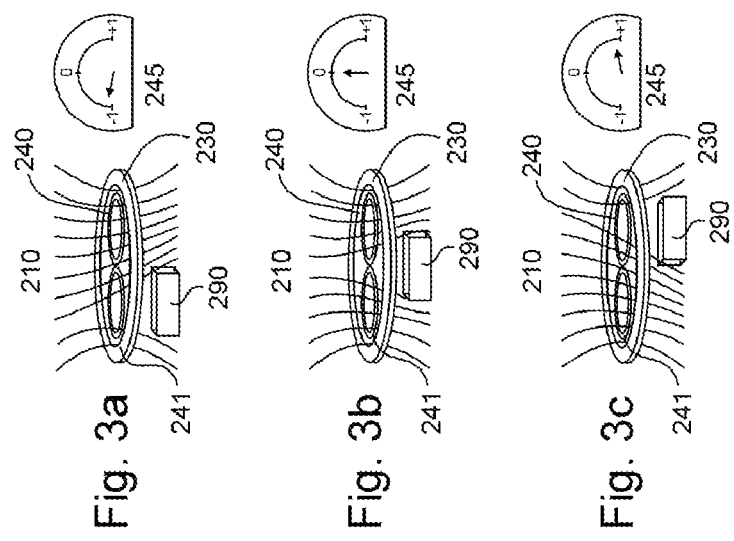
FIG. 3a shows a representation of the operating principle of a sensor when detecting an electrically conductive body in position 1.
FIG. 3b shows a representation of the operating principle of a sensor when detecting an electrically conductive body in position 2.
FIG. 3c shows a representation of the operating principle of a sensor when detecting an electrically conductive body in position 3.

The operating principle of the sensors A 210, B 220 is shown in FIG. 2 for the detection of a ferromagnetic body 280 and in FIG. 3 for the detection of an electrically conductive body 290. In this exemplary embodiment, the principle is represented with reference to the sensor A 210, and the same applies to the second sensor B 220.

The sensor 210 is designed as a differential transformer and has a primary coil 230 and two symmetrically arranged secondary coils 240, 241 each. An AC voltage with constant frequency and amplitude is applied to the primary coil 230. An alternating electromagnetic field is generated via the primary coil 230, which induces an oppositely directed voltage U cos and U sin in each of the secondary coils 240 located within it. The amplitudes of the voltages also change with the distance of the object from the secondary coils 240, 241 when they are in the same position. The secondary coils 240, 241 are connected in series in opposite phase, so that the voltages at their terminals subtract from each other. The resulting voltage is zero exactly when the two coils of the sensor 210 are each symmetrical. If the symmetry is disturbed, the result is an output voltage, the phase of which with respect to the primary voltage indicates the direction, and the value of which indicates the magnitude of the asymmetry. This is achieved by forming the arctan=K*U sin/K*U cos. However, since the object disturbing the symmetry is always equidistant in a first approximation from the two secondary coils, the factor K is taken out of the equation and what remains is the ratio of the induced voltages U sin/U cos, which represents the position of the object disturbing the symmetry.

Here, the symmetry of the sensor 210 is disturbed by the passage of a chain component 280, 290. A ferromagnetic chain component 280 (FIG. 2) disturbs the magnetic field lines such that they are closer together, so that the magnetic field at and around the chain component 280 is amplified. The asymmetry created by the chain component 280 is greatest when the chain component 280 is located in the region of the sensor 210 at the edges of the sensor 210 (FIGS. 2a, 2c), i. e. moved out of or into the sensor area. The sensor 210 then generates a maximum output voltage U=+1 (FIG. 2a) schematically shown on the display 245 when the chain component 280 is positioned at the left edge of the sensor 210 and generates an output voltage U=−1 when the chain component 280 is positioned at the right edge of the sensor 210 (FIG. 2c). The asymmetry and the resulting output voltage generated by the sensor 210 is U=0 at the position of the chain component 280 at the center of the sensor 210 (FIG. 2b).

An electrically conductive chain component 290 (FIG. 3) disturbs the magnetic field lines such that they are further apart, so that the magnetic field at and around the chain component 280 is reduced. The asymmetry created by the chain component 290 is greatest when the chain component 280 is located in the region of the sensor 210 at the edges of the sensor 210 (FIGS. 3a, 3c), i.e., moved out of or into the sensor area. The sensor 210 then generates a minimum output voltage U=−1 (FIG. 3a), shown schematically on the display 245, when the chain component 290 is positioned at the left edge of the sensor 210, and generates an output voltage U=+1 when the chain component 290 is positioned at the right edge of the sensor 210 (FIG. 3c). The asymmetry and the resulting output voltage generated by the sensor 210 is U=0 at the position of the chain component 290 at the center of the sensor 210 (FIG. 3b).

FIG. 4 shows a top view of a sensor A 210 for detecting the position of a chain link. The chain 100 to be monitored has alternating inner and outer side portions, which are connected to one another by chain pins 140 guided in chain bushings 130. The chain pins 140 have a distance p between them. The sensor 210 has the primary coil 230 and two symmetrically arranged secondary coils 240, 241. An AC voltage with constant frequency and amplitude is applied to the primary coil 230. An alternating electromagnetic field is generated via the primary coil 230, which induces an oppositely directed voltage U cos and U sin in each of the secondary coils 240, 241 located within it. In the absence of an object, the resulting voltage is zero because the induced voltages are in the form of an 8 and the current-carrying areas cancel each other out.

Figure 5:
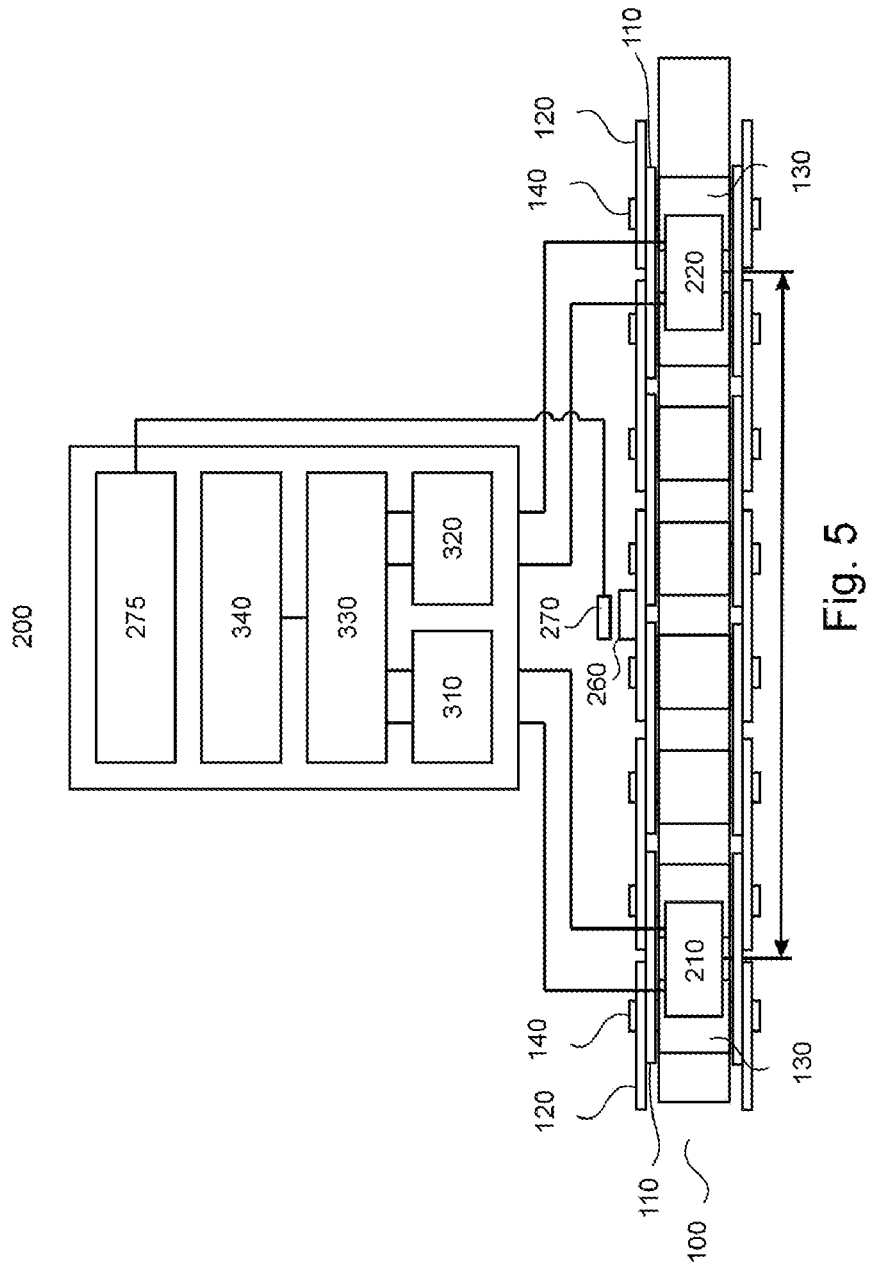
FIG. 5 shows a further embodiment of the sensor device according to the invention and a principal representation of the evaluation circuit.

FIG. 5 shows a top view of a further embodiment of the sensor device 200 according to the invention with evaluation circuits 310, 320. The sensors A 210, B 220 of the chain 100 in a mint condition are also positioned in such a way that the distance d between the sensors 210 and 220 corresponds exactly to an integral multiple of the distances $p_0$ of two adjacent chain pins 140 of the chain 100 to be monitored. As in the previous exemplary embodiments, the sensors 210, 220 may be designed as inductively operating differential transformers with which the position of chain components is determined. However, the sensors 210, 220 may also be optical or magnetic position sensors or a combination of the aforementioned types of sensors. The sensors 210, 220 are each connected to evaluation circuits 310, 320.

The evaluation circuits 310, 320 provide the detected measurement values to an A/D converter 330 in which the analog measurement values are converted to digital values to be stored on the microcontroller 340. In this embodiment, a permanent magnet 260 is disposed on the chain 100 and its position is detected by a Hall sensor 270 and an evaluation circuit 275. The microcontroller connected to the Hall sensor 270 registers the position of the permanent magnet 260 and enables identification of individual chain links via continuous counting.

Figure 6:
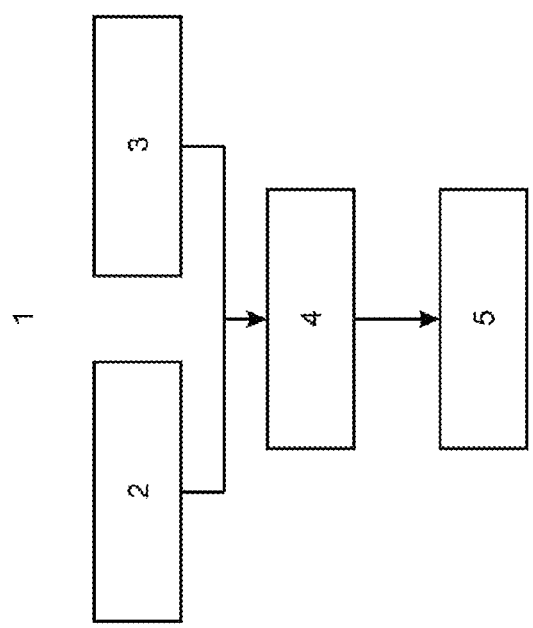
FIG. 6 shows an embodiment of the method according to the invention for determining the elongation of chains.

An exemplary embodiment of the method 1 according to the invention for determining the elongation of chains 100 is shown in FIG. 6. The method 1 starts with a first detection 2 performed by a first sensor 210 for determining the position of a first chain component and detecting a first measurement value. At the same time, a second measurement value is detected with a second detection 3 by means of a second sensor 220 to determine the position of a second chain component identical in construction to the first chain component. The first 210 and second sensor 220 are arranged at a defined distance d from one another corresponding to an integer multiple of the pitch $p_0$ of the chain 100. In the third step 4, the distance between the chain components is determined from the measurement values. In the fourth step 5, the length of the chain 100 is determined from the distance between the chain components. The wear-related elongation of the chain 100 is determined by relating the determined length of the chain 100 to the length of the chain 100 in a mint condition.

REFERENCE NUMERALS 1 method of determining the elongation of chains
2 performing a first detection
3 performing a second detection 4 determining the distance between two chain components
5 determining the elongation of the chain
100 chain
110 inner link of the chain
120 outer link of the chain
130 chain bushing
140 chain pin
200 chain sensor device
210 sensor A
220 sensor B
230 primary coil
240, 241 secondary coil
245 display
250 base plate
260 permanent magnet
270 Hall sensor
275 evaluation circuit magnetic sensor
280 ferromagnetic body
290 non-magnetic body
310 first evaluation circuit
320 second evaluation circuit
330 A/D converter
340 microcontroller
ΔL elongation of the chain
L length of the chain between sensor A and sensor B, in current condition
$L_0$ length of the chain between sensor A and sensor B, in mint condition
$p_0$ pitch (distance between two adjacent chain pins), in mint condition
p pitch (distance between two adjacent chain pins), in current condition
d distance between sensors
a distance between chain pin and edge of sensor A, in current condition
b distance between chain pin and edge of sensor B, in current condition
$a_0$ distance between chain pin and edge of sensor A, in mint condition
$b_0$ distance between chain pin and edge of sensor B, in mint condition

We claim:

1. A method of determining elongation of segments of a chain during operation, comprising the following steps:
    detecting a first position of a first chain component with a first sensor,
    detecting a second position of a second chain component with a second sensor, and
    determining a distance between the first position and the second position, wherein the detection of the first position of the first chain component and the detection of the second position of the second chain component are performed simultaneously
        wherein the first sensor simultaneously detects measurement values over a length range of the chain, and the second sensor simultaneously detects measurement values over a length range of the chain.

2. The method of determining the elongation of segments of a chain (100) during operation according to claim 1 characterized in that
a length value L of the chain is determined from the detected first and second measurement values.

3. The method of determining the elongation of segments of a chain during operation according to claim 1 characterized in that
the first detection is performed with a first sensor and the second detection is performed with a second sensor.

4. The method of determining the elongation of segments of a chain during operation according to claim 1 characterized in that
the first sensor and the second sensor have a known distance d, the distance being a parameter for calculating the length value L of the chain.

5. The method of determining the elongation of segments of a chain during operation according to claim 1 characterized in that
the first and/or the second sensor is/are adapted to detect the measurement values for determining the position of a chain component over a path length range of the chain.

6. The method of determining the elongation of segments of a chain during operation according to claim 1 characterized in that
the positions of the first and/or the second chain component are detected by means of a differential transformer.

7. The method of determining the elongation of segments of a chain during operation according to claim 1 characterized in that
the length between the first chain component and the similar chain component directly adjacent to the first chain component is determined from the first measurement value and the second measurement value.

8. The method of determining the elongation of segments of a chain during operation according to claim 1 characterized in that
the position of the first chain component is determined exclusively from the measurement values detected by the first sensor and/or the position of the second chain component is determined exclusively from the measurement values detected by the second sensor.

9. The method of determining the elongation of segments of a chain during operation according to claim 1 characterized in that
the detected chain components are standard chain components.

10. The method of determining the elongation of segments of a chain during operation according to claim 9 characterized in that
the detected chain components are the pins and/or the bushings of the chain.

11. The method of determining the elongation of segments of a chain during operation according to claim 9 characterized in that
all of the detected chain components of identical construction, which are passed by the sensors, are detected.

12. A sensor device for determining elongations of segments of a chain, the sensor device comprising:
    a first sensor for detecting a first position of a first chain component, and a second sensor for detecting a second position of a second chain component, wherein the detection of the first position of the first chain component and the detection of the second position of the second chain component are performed simultaneously thereby facilitating a determination of a distance between the first position and the second position,
    wherein the first sensor simultaneously detects measurement values over a length range of the chain, and the second sensor simultaneously detects measurement values over a length range of the chain.

13. The sensor device for determining elongations of segments of a chain according to claim 12, characterized in that the sensor device simultaneously detects the measurement values for determining the position of the first chain component and the position of the second chain component.

14. The sensor device for determining elongations of segments of a chain according to claim 12
   characterized in that
the first sensor and the second sensor detect the measurement values for determining the position of the first or the second chain component over a path length range of the chain.

15. The sensor device for determining elongations of segments of a chain according to claim 14
   characterized in that
the path length range is greater than or equal to ½ segment length.

16. The sensor device for determining elongations of segments of a chain according to claim 14
   characterized in that
a segment length corresponds to the distance between the first and the directly adjacent second chain component.

* * * * *